United States Patent [19]
Ziegler

[11] Patent Number: 4,902,192
[45] Date of Patent: Feb. 20, 1990

[54] ARTICLE CONTROL ASSEMBLY FOR ARTICLE TRANSFER DEVICE

[75] Inventor: Kelly W. Ziegler, Crosby, Minn.

[73] Assignee: Minnesota Automation, Inc., Crosby, Minn.

[21] Appl. No.: 195,776

[22] Filed: May 19, 1988

[51] Int. Cl.$^4$ .............................................. B66C 1/02
[52] U.S. Cl. .................................. 414/732; 198/476.1; 198/803.5; 198/803.9; 414/736; 414/737
[58] Field of Search ............... 198/476.1, 474.1, 471.1, 198/803.5, 803.9, 470.1, 408; 271/95; 493/315, 318; 414/732, 736, 737

[56] References Cited

U.S. PATENT DOCUMENTS

| | | | |
|---|---|---|---|
| 2,984,162 | 5/1961 | Gordon | 493/315 X |
| 3,937,458 | 2/1976 | Langen | 271/95 |
| 4,391,083 | 7/1983 | Fox | 198/803.9 X |
| 4,516,765 | 5/1985 | Stocco et al. | 271/95 |
| 4,537,587 | 8/1985 | Langen | 493/315 |
| 4,643,633 | 2/1987 | Lashyro | 198/474.1 X |
| 4,740,129 | 4/1988 | Sponseller | 198/476.1 X |

FOREIGN PATENT DOCUMENTS 1316933  5/1973  United Kingdom ............ 198/803.9

Primary Examiner—Robert J. Spar
Assistant Examiner—D. Glenn Dayoan
Attorney, Agent, or Firm—Anthony C. Eggink

[57] ABSTRACT

An article control assembly and process for an article transfer mechanism of an article transfer device for moving articles to a predetermined location. The article control assembly has an articulated member for engaging the transferred articles. A synchronization structure for the articulated member is provided for controlling the movement of the articulated member with respect to the article control mechanism. The synchronization structure further has a rotational velocity control mechanism. A rotational acceleration control mechanism is further provided for the articulation member. The synchronization structure and the rotational acceleration control structure act on the articulated member to control the articles during transfer.

16 Claims, 6 Drawing Sheets

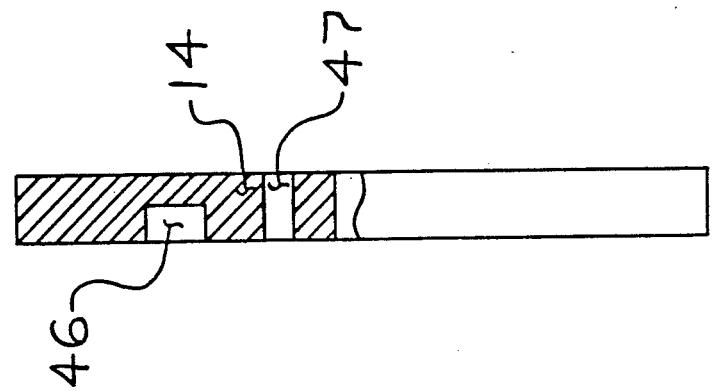
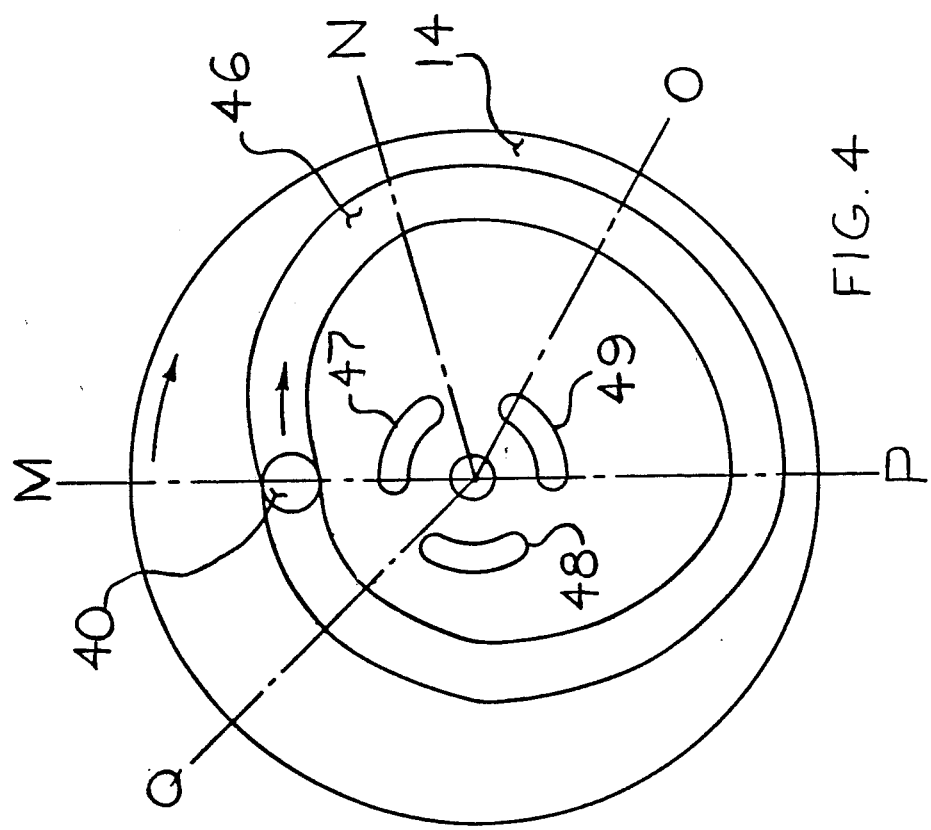

| ROTATIONAL TRAVEL | POSITION | | | |
|---|---|---|---|---|
| | I | II | III | I |
| A | 0° | 120° | 240° | 360° (1) |
| B | 0° | 360° | 720° | 1080° (3) |
| C | 0° | 240° | 480° | 720° (2) |

ARTICLE CONTROL ASSEMBLY FOR ARTICLE TRANSFER DEVICE

BACKGROUND OF THE INVENTION

This invention relates to article transfer devices for the pickup, transfer, and delivery of articles. Particularly, this invention relates to an article control assembly for article transfer devices to increase the reliability and efficiency of transferring articles from and to a plurality of predetermined locations and in a plurality of transfer paths.

It has become increasingly necessary and desirable in mechanized manufacturing, assembly, and packaging operations to enable the pickup, transfer, and delivery of articles of various shapes and dimensions in the most reliable, precise, and high-speed manner. Many types of such devices have been developed, including the utilization of rotary transfer devices having one or more article transfer mechanisms.

However, due to the many configurations, shapes, and sizes of articles required to be transferred and processed, it has become increasingly difficult for manufacturers and assemblers to use suitable article transfer mechanisms which enable the precise and reliable pickup, transfer, and placement of these articles in an efficient manner for subsequent manufacturing or packaging operations.

The article control assembly and process of this invention are for use with the article transfer mechanism of an article transfer device, such as a rotary transfer device, to increase the efficiency, accuracy and speed of transferring and placing various articles at predetermined locations. Particularly, the article control assembly is useful with a rotary transfer device to transfer carton blanks and to open them and set them in a position for subsequent packaging purposes. The article control assembly functions in cooperation with the vacuum cups of the article transfer mechanism to control and guide the articles for placement at predetermined locations. The article control assembly of this invention is a cam actuated assembly having a gear reduction mechanism to guide an articulated structure for controlling and guiding the articles being transferred.

Although various means have been taught to transfer articles from one location to another, and although one reliable and desirable means is the utilization of a rotary transfer mechanism, shortcomings and limitations with respect to the effective transfer and delivery of articles still exist. Particularly, these limitations and shortcomings include the inability of the transfer mechanism to pickup and deliver articles of specific shapes and sizes in a precise and reliable manner.

These shortcomings and limitations generally relate to the inherent limitations in the design of the article transfer mechanisms themselves. Particularly, the shortcomings and limitations are due to the inability of the transfer mechanisms to handle articles of unique shapes and sizes. The article control assembly of this invention having the cam actuated article control mechanism is designed to overcome the limitations of the prior known mechanisms for handling the pickup, transfer, and placement of articles having unique configurations and sizes. The cam actuated article control mechanism of this invention is an articulated mechanism for use with article transfer devices, such as rotary transfer devices, and which mechanically guides and controls the transfer and placement of those articles. As far as is known, and despite the need for article control assemblies of this nature, no such devices have been disclosed or proposed.

SUMMARY OF THE INVENTION

The article control assembly of this invention is for an article transfer mechanism of an article transfer device, such as one utilized for placing articles onto a synchronized conveyor. The article control assembly has an articulated member for engaging the transferred article. A synchronization means is provided for the articulated member to control the movement of the articulated member with respect to the article transfer mechanism. The synchronization means is further comprised of a rotational velocity control mechanism.

A rotational acceleration control means is provided for the articulation member. The synchronization means and the rotational acceleration control means acts on the articulated member to control and aid in the placement of the articles being transferred.

The article control assembly can further be provided with a number of articulated member structures having predetermined configurations. Additionally, the article control assembly is provided with synchronization means which include a gear reduction mechanism which is driven by the article transfer mechanism. Additionally provided is an assembly wherein the rotational acceleration control means includes a cam structure and a cam follower which is in communication with the articulated member.

Additionally provided by this invention is a process for engaging and controlling an article during transfer.

These and other benefits of this invention will become clear from the following description, by reference to the drawings.

BRIEF DESCRIPTION OF THE DRAWINGS

FIG. 4 is a schematic frontal plan view showing the cam structure of the article control assembly of this invention; and FIG. 5 is a schematic side plan view of the cam structure shown in FIG. 4;

DESCRIPTION OF THE PREFERRED EMBODIMENTS

Figure 1:
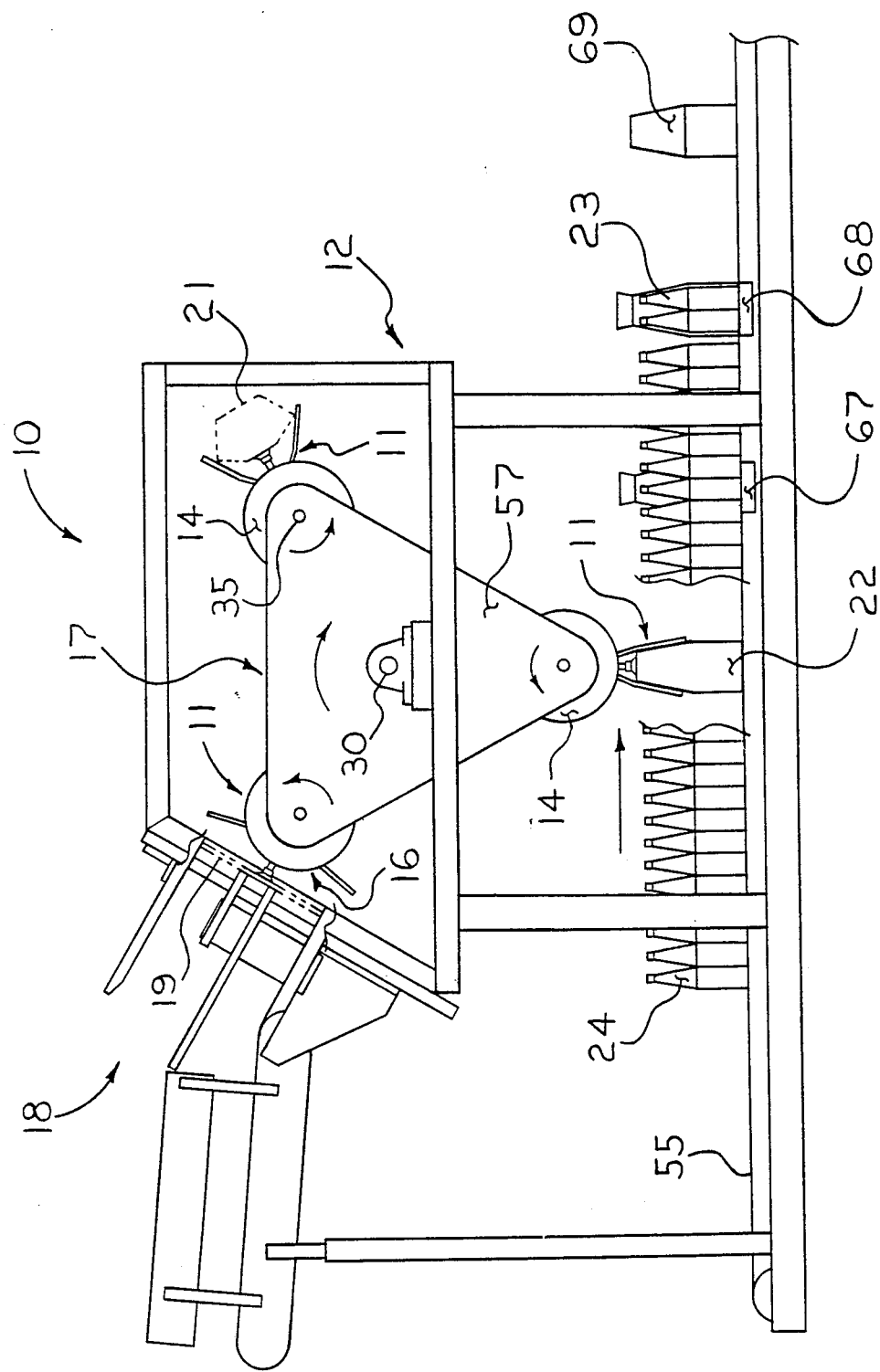
FIG. 1 is a schematic lateral plan view of the rotary transfer device having the article control assembly of this invention.

Referring to FIG. 1, a rotary transfer device 10 is there shown for the pickup, transfer and placement of articles. Rotary transfer devices of this structure are known in the art. For example, Applicant's assignee manufactures rotary transfer devices as disclosed in U.S. Pat. Nos. 4,530,686 and 4,643,633. These rotary transfer devices utilize frame structures upon which article pickup and deposit mechanisms travel in predetermined paths. The rotary transfer devices include a stationary gear, at least one planetary gear and structure for rotating the planetary gear about the stationary gear. An article transfer mechanism is in communication with each planetary gear for the pickup and delivery of articles, such as cartons.

In the structure of U.S. Pat. No. 4,643,633, a second stationary gear is mounted for rotation with the first planetary gear and a second planetary gear is provided for rotation about the second stationary gear. In this rotary device structure, the article transfer mechanisms are in communication with the second planetary gears to transfer the articles or products.

It is within the purview of this invention to use the article control assembly with article transfer devices such as the rotary devices of the above two referenced patents. Additionally, the article control assembly can be utilized with other prior art article transfer devices, such as rotary transfer devices which utilize chains to drive the article transfer mechanisms and those which utilize stationary pin arrangements to drive the article transfer mechanisms, for example as disclosed in the structures manufactured by MGS Machine Corporation.

Figure 2:
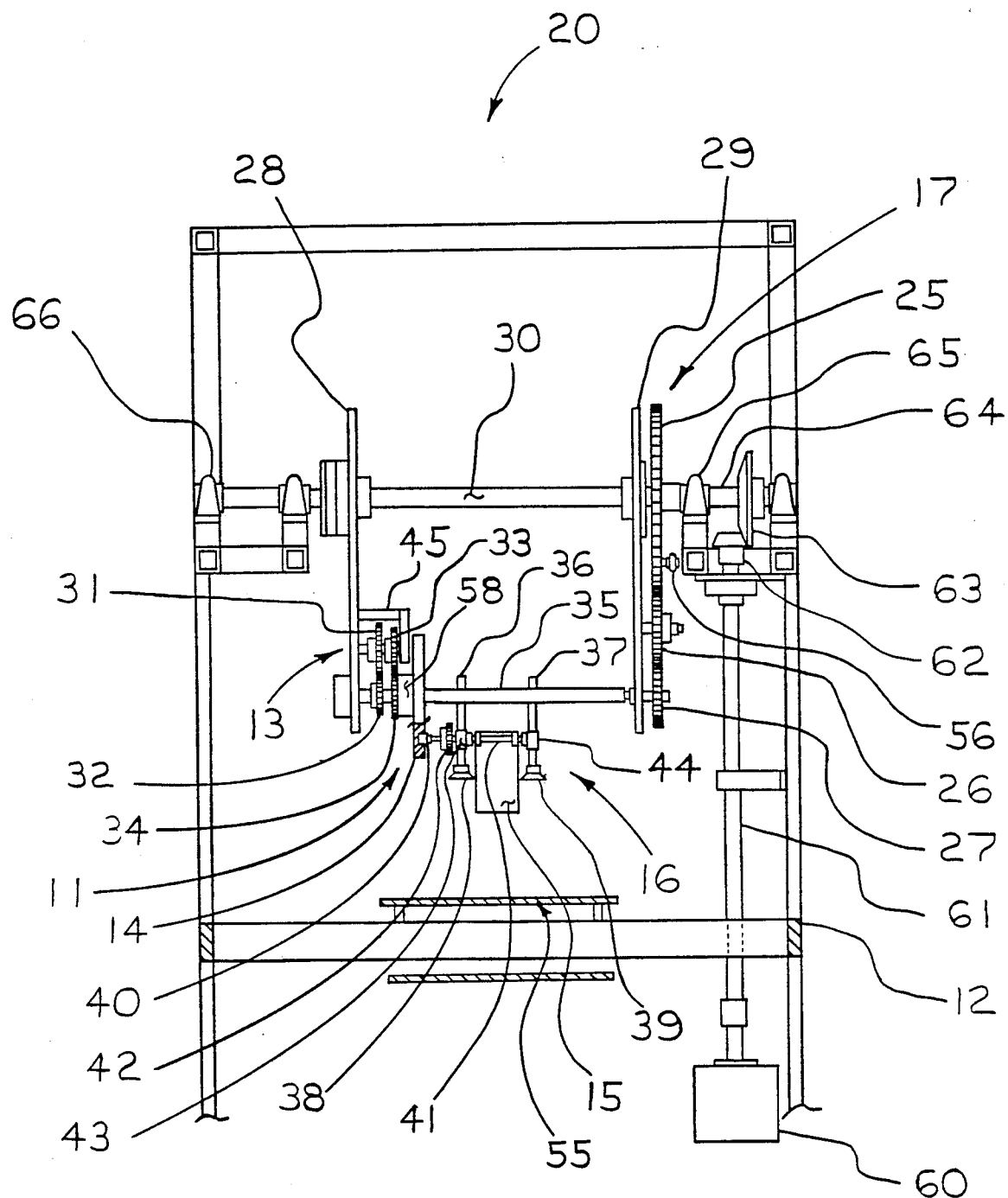
FIG. 2 is a schematic frontal plan view of another rotary transfer device having an article control assembly according to this invention.

As shown in FIGS. 1 and 2, the article control assembly 11 of this invention is particularly useful to aid in the set up of cartons onto conveyors moving product groups, such as groups of bottles. For example, the article control assembly 11 aids in the proper and reliable opening of cartons 19 from a storage magazine 18 to thereby increase the speed at which the cartoner functions. As will be further discussed, the assembly 11 preferably has a structural configuration to engage cartons of a specific style and size. The assembly 11 of the invention as shown, is particularly useful in the opening and placement of tall and narrow cartons, such as gable-style carton configurations used to package 6 packs of beverages. The article control assembly 11 partially opens the individual carton during transfer so that air or space is provided between previously touching surfaces of the flat and folded carton structures to, thereby, increase the reliability of opened carton placement onto a line conveyor.

FIG. 1 illustrates the rotary transfer device 10 having the article control assembly 11 of this invention. As is known, the rotary transfer device 10 has a frame structure 12, a rotary transfer device 17, and a number of article transfer mechanisms 16. The rotary transfer device 17 rotates in a continuous manner whereby the article transfer mechanisms 16 reach apex positions of travel at predetermined locations. As shown, at one such location, the article transfer mechanism 16 engages the article storage means 18 to remove individual cartons 19. Each article transfer mechanism 16 rotates with respect to the rotation of the rotary transfer device 17 and reaches an apex position at its bottom to place the articles or cartons 19 into an opened position for subsequent packaging to form groups of individual products or bottles 24. The product groups 23, for example groupings of six, are continuously moved below the rotary transfer device 17 on a line conveyor 55.

As shown, the article control assembly 11 functions in cooperation with the article control mechanism 16 to engage the articles or cartons 19. As will be further described, the article control assembly is comprised of members which articulate to engage the individual cartons to provide an opened and partially constructed carton structure 21 and to aid in the placement of carton structures 22 for subsequently packaging the product groups 23 on conveyor 55.

As further shown, the carton structures 22 are placed onto line conveyor 55 in proximity to an instream flow of individual products 24. Thereafter, and as known in the art, the carton structures 22 are opened to form configurations 67 whereby the product groupings 23, for example, 6 packs of bottles 23, are subsequently inserted into the aligned carton configuration 68. Thereafter, and as also known in the art, the carton configuration 68 is closed, for example, via tab insertion or gluing, to form a completed package 69, for example, a completed 6 pack of product.

FIG. 2 illustrates a rotary transfer device 20 having the article control assembly structure 11. As opposed to the rotary transfer device 17 of FIG. 1 having three article transfer mechanisms 16, the rotary transfer device 20 is shown to have one such article transfer mechanism 16. The rotary transfer device structure 20, having the single article transfer mechanism 16, may be a partial showing of the device of FIG. 1. However, as is disclosed in U.S. Pat. No. '686, rotary transfer devices may have any number of article transfer mechanisms 16, for example, 1, 2, 3, or 4 mechanisms 16 depending upon the types of articles being transferred, the size and shape of those products, and the desired speed of article transfer. However, the utilization of an article control assembly structure 11 with an article transfer mechanism 16 is the same for any such article transfer device.

The rotary transfer device 17 has a center shaft 30 mounted for rotation in journals 65 and 66 which are supported by frame structure 12. A pair of side plates 28 and 29 are provided for supporting the remaining elements of the rotary transfer device and which rotate with the center shaft 30. The movement of the rotary transfer device 17 is provided by a power source 60, a drive shaft 61, and bevel gears 62 and 63. The shaft portion 64 of shaft 30 extends from the beveled gear 63 to provide rotation for the center shaft 30.

As is known, the center gear 25 is stationary and is connected to the frame 12 by means of a connecting structure 56. A side plate 29 is shown connected to the idler gear 26 and the planetary gear 27. Extending for rotation with the planetary gear 27 is the vacuum shaft 35 from which vacuum stems 36 and 37 extend. The vacuum stems 36 and 37 respectively have vacuum cups 38 and 39 to engage the articles 19.

Figure 7:
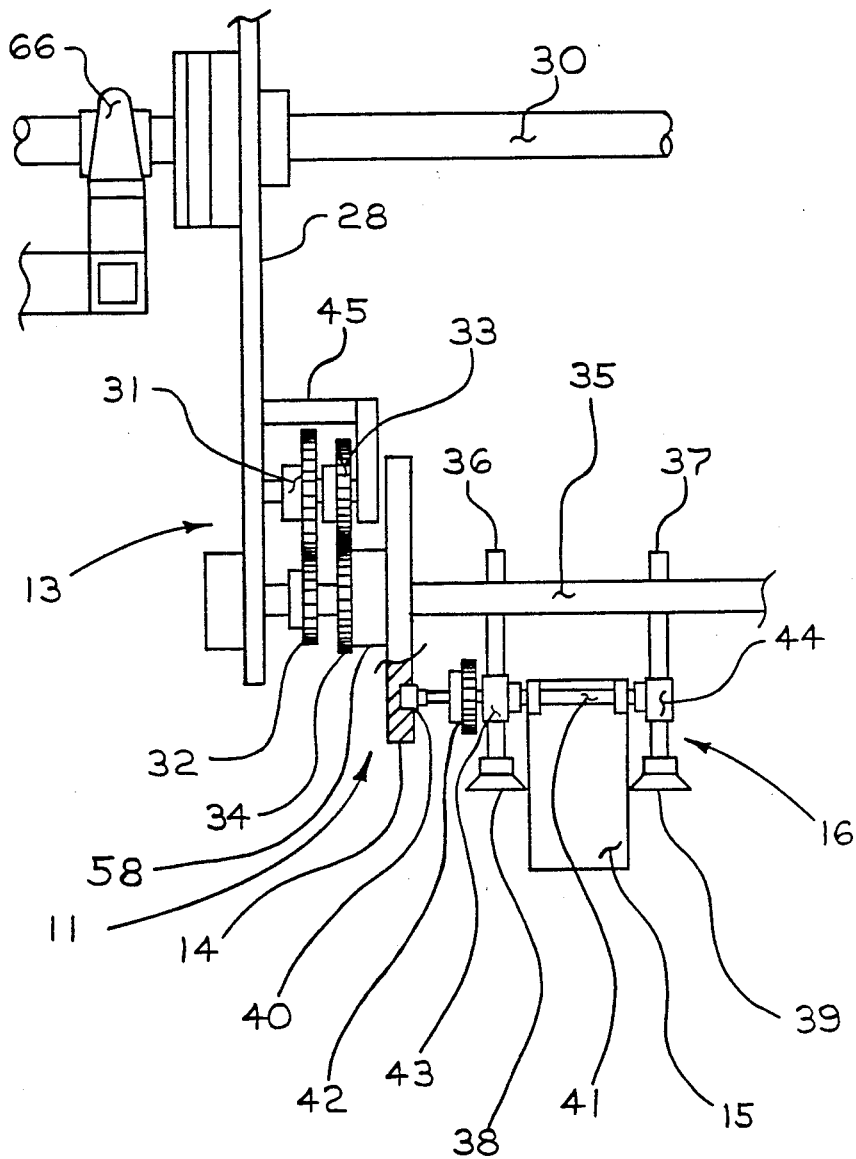
FIG. 7 is an enlarged view of the article control assembly shown in FIG. 2.

As further shown in FIGS. 2 and 7, the article control assembly 11 is located at the end of the vacuum shaft 35 and adjacent the side plate 28. The article control assembly 11 is comprised of a gear reduction mechanism 13, which provides synchronization and controls the rotational velocity of the article control assembly 11. The gear reduction mechanism 13 is further comprised of gears 31 and 32 and gears 33 and 34. As shown, gear 32 rotates in direct proportion with the vacuum shaft 35. A larger gear 31 is provided in communication with gear 32 (3:2 ratio) to reduce the rotational velocity so that the reduced rotational velocity is transferred from gear 33 to gear 34. Bracket 45 secures the gear reduction mechanism to the side plate 28 of the rotary transfer device 17.

The gear reduction is transferred directly from gear 34 to the cam structure 14 which is mounted for relative rotation with respect to the vacuum shaft 35. Thus, the cam structure 14 rotates at the same rotational velocity as the gear 34 of the gear reduction mechanism 13. Working in cooperation with the cam structure 14 is a cam follower 40 which is in direct communication with shaft 41 from which the articulated member 15 extends. The shaft 41 is shown supported by the vacuum stems 36 and 37 by means of connector assemblies 43 and 44. Thus, movement of the articulated member 15 is dependent upon the movement of the cam follower 40 in the cam structure 14. However, the rotational velocity of the cam structure 14 is dependent upon the gear reduction mechanism 13.

Figure 3:
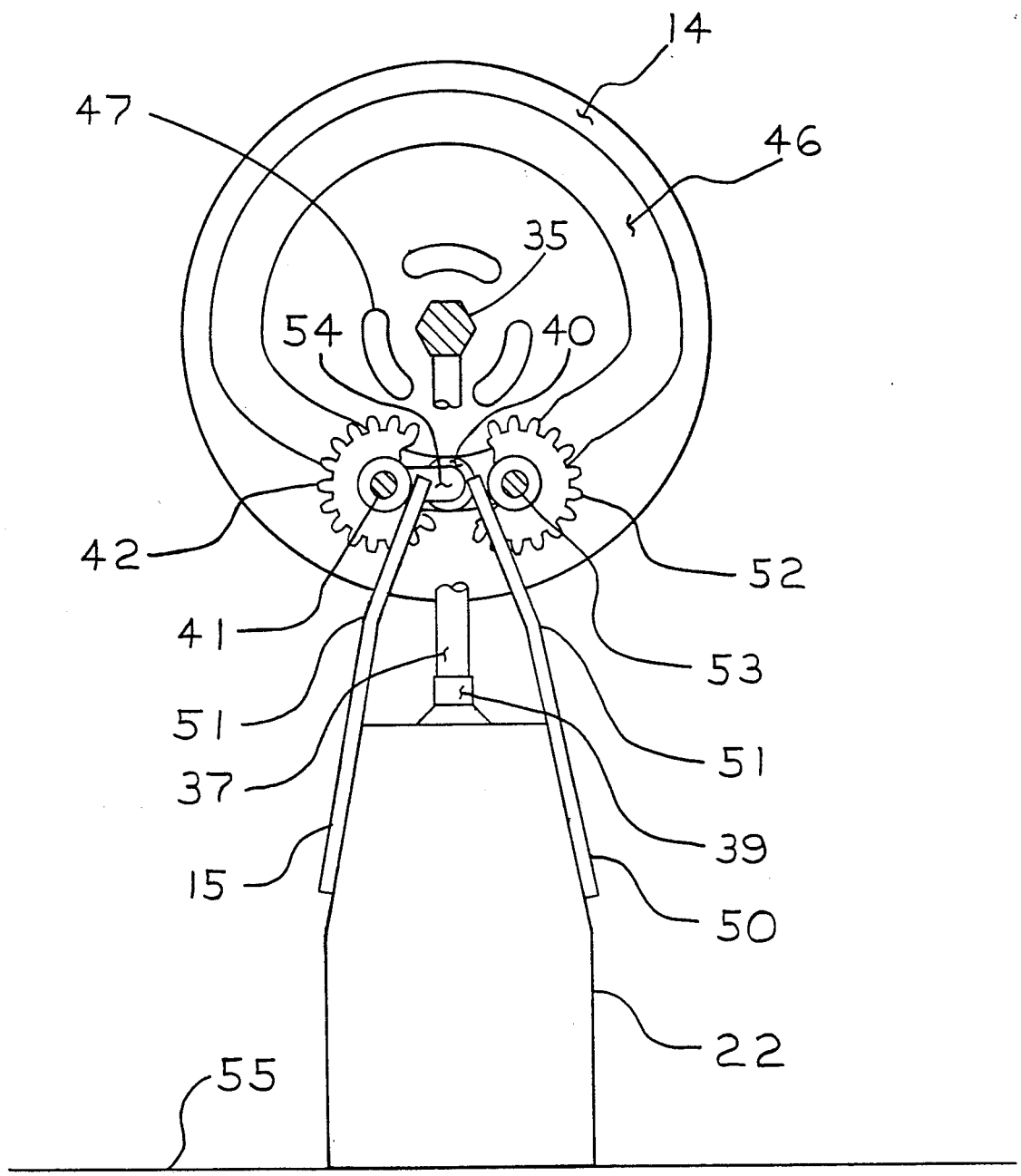
FIG. 3 is a schematic lateral plan view of the cam actuated article control assembly of this invention.

FIG. 3 illustrates the mechanism which provides the rotational acceleration to the articulated member 15. As shown in this particular embodiment, the articulated member 15 works in conjunction with an opposing articulated member 50, each being rigid plate members having a bend 51. As previously discussed, the articulated member 15 is attached to shaft 41, which extends from the arm 54 which is connected to the cam follower 40. This embodiment further shows the use of a shaft 53 to which the articulated member 50 is attached. Movement of the articulated members 15 and 50 is controlled by transfer gears 42 and 52. Gear 42 is mounted to the shaft 41 and gear 52 is mounted to an opposing shaft 53, whereby the movement of the gear 42 as a result of the movement of the cam follower 40 in cam track 46 causes an equal and opposing movement of the second articulated member 50. Thus, as the vacuum cup 39 having the carton 22 held thereby is moved, the articulated members 15 and 50 move independently but in cooperation with the vacuum cup 39 to physically act upon the carton 22.

FIG. 4 shows the cam structure 14. The cam structure 14 has cam adjustment slots 47, 48 and 49 to fasten and adjustably fix the cam structure 14 to hub 58 having bearings and which is mounted for rotation on the vacuum shaft 35 of the article transfer mechanism 16. The cam structure 14 has a cam track 46 which has a predetermined configuration to control the movement of the cam follower 40. The movement of the cam follower 40 causes the articulated members 15 and 50 to open and close depending upon the relative placement of the cam follower in the cam track 46. Additionally, the relative movement of the cam structure 14 with respect to the cam follower controls the speed of the articulated member movement. As shown, the configuration of the cam track 46 is not circular or uniform. The non-uniform configuration causes the articulated members 15 and 50 to accelerate and decelerate at predetermined locations. Thus, the relative change in radius of the cam track 46 with respect to the cam center causes the cam follower to accelerate and decelerate to cause the members 15 and 50 to move correspondingly.

Although a closed cam structure 14 with a cam track 46 and a cam follower 40 is here shown and described, the use of other cam structures are within the purview of this invention. For example, an open cam structure having the cam track located on the periphery thereof for controlling the movement of a biased cam follower can also be utilized according to the teachings of this invention. The important result being the relative movement of the cam follower with respect to the center of the cam structure as defined by the cam track.

As further shown in FIG. 4, the cam follower 40 is positioned at the top of the cam track 46 at a location "M". At this location, the cam track curvature or slope of track 46 with respect to the center of the cam, or as measured by the relative change in radius, is such so that the articulated members 15 and 50 are fully closed at the position of product placement. Both the cam follower 40 and the cam structure 14 are shown to rotate in a clockwise manner. As will be further described, the cam follower 40 rotates at 3 revolutions per product placement, while the cam structure 14 rotates at 2 rotations per product placement. Thus, as the cam follower 40 moves in cam track 46 from position "M" to position "N", the articulated members 15 and 50 open in a constant manner as a result of the cam track curvature between those two points. At position "N" the articulated members 15 and 50 are fully open and while maintaining that position, at location "O" the article transfer mechanism 16 picks another product from the article storage means 18. At position "P" the articulated members 15 and 50 begin closing in a modified sine motion as a result of the cam track curvature until the cam follower 40 reaches the position "Q", at which point the articulated members are closed and in direct product forming contact with the article being transferred. When the cam follower 40 reaches position "M", the articulated members are still fully closed, and the article being transferred is placed at that point as onto a conveyor line, for example.

The description with respect to FIG. 4 is an example of how the precise placement of the articulated members 15 and 50 are affected and controlled by the rotation of the cam structure 14 and the relative rotation of the cam follower 40 in the cam track 46. In practice, the configuration and arrangement of the articulated member 15 and/or cooperating member 50 is first determined. This determination is made in view of the desired function of the articulated member(s) and their contact or impact on the transferred articles, i.e., whether shaping the transferred articles into a predetermined configuration or actually grasping the articles for transport, as will be further described. When the desired function and configuration of the articulated members is specified and when the relative rotations of the cam 14, the cam follower 40 and the article transfer device 10 are specified, the sloping configuration of the cam track 46 can be determined by the desired and predetermined placement of the articulated member(s). Thus, by determining the desired positioning of the articulated member(s) at various points during one revolution of the article transfer device 10, the corresponding and required placement of the cam follower 40 with respect to the center of the cam 14 can be plotted to determine the configuration of the cam track 46. The resultant cam track 46 having varying slopes with respect to the axial center of the cam 14 will cause the cam follower 40 and thus the articulated member(s) to accelerate and decelerate at predetermined times during each revolution of the article transfer device 10.

FIG. 5 is a side view of the cam structure 14 and showing the cam track 46 as well as the cam adjustment slot 47 which permits the cam to be adjusted to fine tune the relative movement of the cam follower 40 and thus the articulated members 15 and 50.

Figure 6:
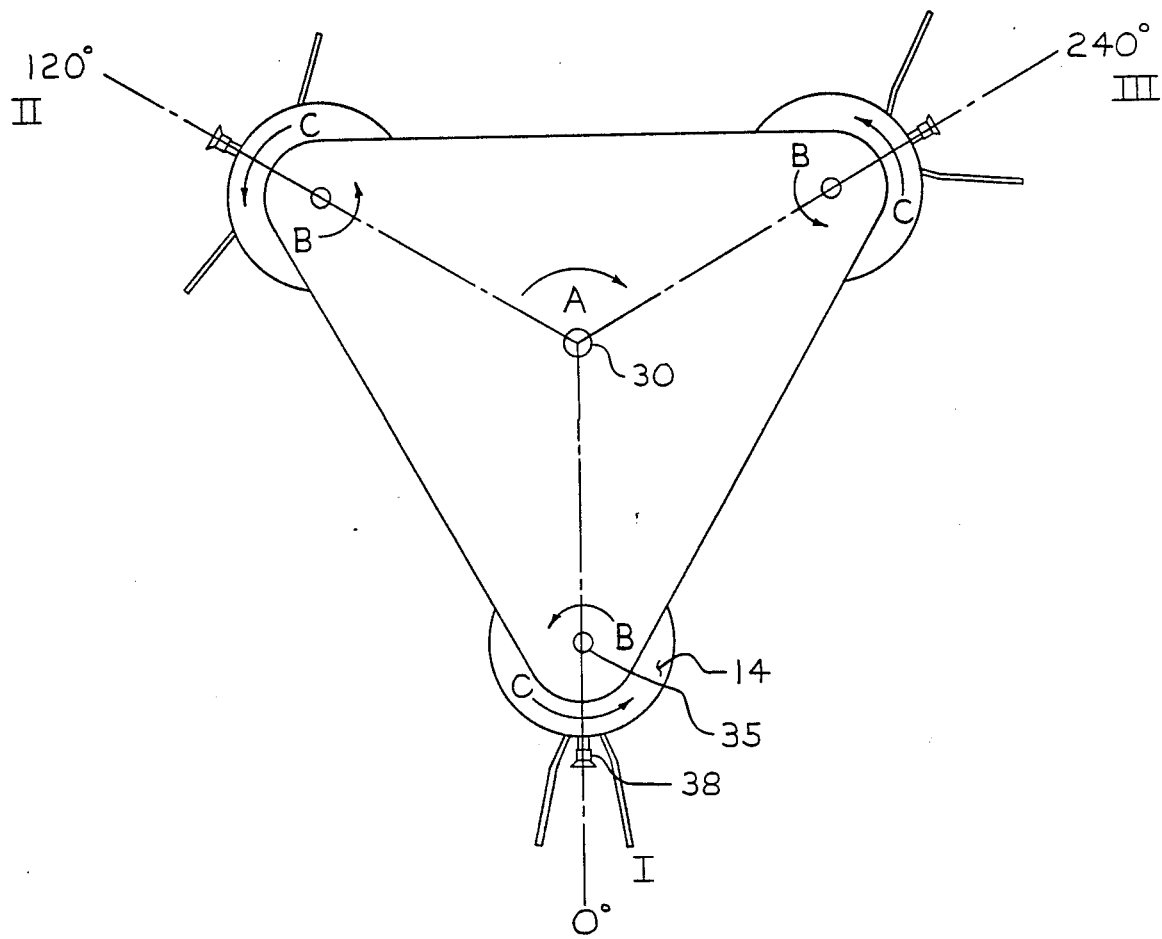
FIG. 6 is a schematic geometric, time-location diagram which shows the transfer path of an article from the article storage magazine to a conveyor deposit location and showing the operation of the article control assembly with respect to the movement of the rotary transfer device.

FIG. 6 is a geometric representation of the relative rotational movement of the rotary transfer device, the article transfer mechanism and the article control assembly. This relative rotational representation aids in understanding the movement of the articulated members with respect to the vacuum cups of the article transfer mechanism. Arrow "A" indicates the rotational movement of the side plate 57 about center shaft 30.

Arrows "B" indicate the rotational movement of the vacuum shaft of the article transfer mechanism from which the vacuum cups extend. Arrows "C" indicate the rotational movement of the cam structure which controls the rotational movement of the articulated member.

The rotary transfer device shown in FIG. 6 has three heads or article transfer mechanisms as the device shown in FIG. 1. The device is further constructed and arranged to have three stops or apex positions of travel of its vacuum cups 38. As is known, various numbers of heads and positions of travel can be effectuated by altering the number and configurations of the gearing ratios.

As shown in FIG. 6, the rotary transfer device "A" rotates through positions I, II and III to complete its 360° rotation. Each article transfer mechanism "B" rotates in an opposite direction and completes one revolution between each position. Thus, for each revolution "A", each transfer mechanism "B" makes three revolutions. Each cam structure "C" makes two revolutions for each single revolution "A" or for every three revolutions "B". Thus, the rotational movement "C" of the cam structure lags the rotational movement "B" of the article transfer mechanism.

The reduced rotational movement of the cam "C" with respect to the article tranfer mechanism "B" is accomplished by means of the gear reduction mechanism "B" described above with respect to FIGS. 2 and 7. This relative rotational movement reduction permits the articulated member 15 to be accelerated and decelerated by means of the movement of the cam follower 40 in the cam track 46 to function either in cooperation with the vacuum cups 38 or 39 or as a cooperating structure having members 15 and 50 directly on the articles 19. Thus, it is within the purview of this invention to utilize a single articulated member 15, cooperating members 15 and 50, and both of the foregoing configurations used with or without cooperating vacuum cups 38 and 39 or like article grouping structures. The members 15 and 50 can have any desired configurations including those constructed and arranged to remove articles from an article storage means.

The article control assemblies are designed to work in conjunction with the vacuum cups of the article transfer mechanisms of the rotary transfer device. The article control assemblies are operated by a cam structure, a cam follower and a gear reduction mechanism to cause the articulated members or opposing finger or plate structures to open and close in synchronization with the movement of the rotating article transfer mechanism.

Thus, as the article transfer mechanism rotates as part of the rotary device, the cooperating article control assembly opens and closes with respect to the vacuum cups to contact the carton or article held by them. As the vacuum cups engage and remove a carton blank from the storage magazine at an apex point of travel, the article control assembly closes to guide the carton blank into an opened and partially constructed position for subsequent packaging purposes.

As many changes are possible to the embodiments of this invention, utilizing the teachings thereof, the description above and the accompanying drawings, should be viewed in the illustrative and not in the limited sense.

That which is claimed is:

1. An article control assembly for an article transfer mechanism of a transfer device for transferring articles onto a synchronized conveyor comprising:

a. at least one articulated member for engaging the articles,
   b. synchronization means operative on said articulated member for controlling the movement of said articulated member with respect to the article transfer mechanism, said synchronization means further comprising a rotational velocity control mechanism, and
   c. rotational acceleration control means operative on said articulation member comprising a cam structure, a cam follower and a connecting structure between said cam follower and said articulated member, said rotational velocity control mechanism further having means to rotate said cam structure with respect to the article transfer mechanism of the transfer device, whereby said velocity control mechanism and said rotational acceleration control means cause said articulated member to contact and control the transfer of articles.

2. The article control assembly of claim 1, wherein an opposing articulated member is provided for synchronized movement with said articulated member.

3. The article control assembly of claim 1, wherein said synchronization means includes a gear reduction mechanism driven by the article transfer mechanism.

4. The article control assembly of claim 1, wherein said cam structure has a cam track having non-circular path portions to cause said cam follower to accelerate and decelerate.

5. The article control assembly of claim 1, wherein said assembly has an opposing articulated member and wherein said articulated members are articulated plate members having planar portions defined by a bend for engaging opposing sides of a carton during transfer.

6. The article control assembly of claim 1, wherein the transfer device is a rotary transfer device.

7. An article control assembly for an article transfer mechanism of a transfer device for transferring articles, the article transfer mechanism further having an article grasping structure having a drive shaft and an outwardly extending shaft for holding the article grasping structure, said article control assembly comprising:

a. an articulated member for engaging an article, said articulated member further having a mounting shaft for rotation with said outwardly extending shaft of said article grasping structure,
   b. synchronization means connected to said mounting shaft of said articulated member for controlling the movement of said articulated member with respect to the article transfer mechanism, said synchronization means further comprising a rotational velocity control mechanism, and
   c. connecting means between said articulated member and said synchronization means.

8. The article control assembly of claim 7, wherein said assembly includes a second and opposing articulated member in opposite cooperation with said first articulated member.

9. The article control assembly of claim 7, wherein said connecting means is comprised of a cam structure mounted for rotation on the drive shaft of the article transfer mechanism, said cam structure being in communication with said rotational velocity control mechanism.

10. The article control assembly of claim 9 wherein said cam structure has a cam track for a cam follower and wherein said cam track has non-circular path portions to accelerate and decelerate said articulated member.

11. The article control assembly of claim 7, wherein said assembly has an opposing articulated member and wherein said articulated members are articulated plate members having planar portions defined by a bend for engaging opposing sides of a carton during transfer.

12. The article control assembly of claim 7, wherein said rotational velocity control mechanism is comprised of a gear reduction mechanism.

13. The article control assembly of claim 7, wherein the transfer device is a rotary transfer device.

14. The article control assembly of claim 7, wherein said assembly is for placing articles onto a synchronized conveyor.

15. A cam actuated article control mechanism for a rotary transfer device for the pickup, transfer, and placement of articles comprising:
   a. a rotary transfer apparatus having a frame structure, a first stationary gear mounted to said frame structure, the first stationary gear additionally having a shaft extending through its center for rotation relative to said stationary gear, a supporting plate member fixed to the rotatable shaft for rotation therewith, a first planetary gear mounted on said plate member for rotation about said first stationary gear, drive means for rotating said shaft, means in contact with said first planetary gear for rotating said first planetary gear relative to said first stationary gear, and an article transfer mechanism having a vacuum shaft and vacuum cups extending therefrom for engaging articles, said article transfer mechanism being mounted for rotation with said first planetary gear,
   b. a gear reduction mechanism for rotation about said vacuum shaft of said article transfer mechanism for the reduction of relative movement with respect to said first planetary gear,
   c. a cam structure having a cam track and cam follower for rotation about said vacuum shaft and driven by said gear reduction mechanism, and
   d. an articulated article control mechanism mounted adjacent to and spacially from said vacuum cups and being connected to and driven by said cam follower and being of a predetermined configuration for contact with the transferred articles.

16. The cam actuated articulated article control mechanism of claim 15, wherein said articulated control mechanism is comprised of opposing and cooperating plate members having planar portions defined by a bend and further having meshing gears to drive its cooperating motion.

* * * * *